United States Patent
Dasika et al.

(10) Patent No.: US 12,408,577 B2
(45) Date of Patent: Sep. 9, 2025

(54) SYSTEMS AND METHODS FOR SOIL CLOD DETECTION

(71) Applicant: CNH Industrial America LLC, New Holland, PA (US)

(72) Inventors: Surya Saket Dasika, Lombard, IL (US); Srujan Kusumba, Louisville, KY (US); Hrudhansh Ubale, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 925 days.

(21) Appl. No.: 17/564,458

(22) Filed: Dec. 29, 2021

(65) Prior Publication Data
US 2023/0200287 A1 Jun. 29, 2023

(51) Int. Cl.
*A01B 79/00* (2006.01)
*A01B 63/00* (2006.01)
*G01S 17/894* (2020.01)
*A01B 27/00* (2006.01)
*A01B 49/02* (2006.01)

(52) U.S. Cl.
CPC .......... *A01B 79/005* (2013.01); *A01B 63/002* (2013.01); *G01S 17/894* (2020.01); *A01B 27/005* (2013.01); *A01B 49/02* (2013.01)

(58) Field of Classification Search
CPC ... A01B 79/005; A01B 63/002; A01B 27/005; A01B 49/02; G01S 17/894
See application file for complete search history.

(56) References Cited

U.S. PATENT DOCUMENTS

| | | | |
|---|---|---|---|
| 6,761,120 B2 | 7/2004 | Kovach et al. | |
| 7,017,675 B2 | 3/2006 | Ankenman et al. | |
| 8,224,097 B2 | 7/2012 | Matei et al. | |
| 8,714,276 B2 | 5/2014 | Hake et al. | |
| 9,330,435 B2 | 5/2016 | Goodman et al. | |
| 9,428,885 B2 | 8/2016 | Nau | |

(Continued)

FOREIGN PATENT DOCUMENTS

| | | |
|---|---|---|
| EP | 0177024 | 1/1989 |
| WO | WO 2018/107242 | 6/2018 |

OTHER PUBLICATIONS

V.K. Shettigara et al. "Height Determination of Extended Objects Using Shadows in SPOT Images" Jan. 1998, PE&RS; vol. 64 abstract; p. 35-44 (Year: 1998).*

(Continued)

*Primary Examiner* — Gertrude Arthur Jeanglaude
(74) *Attorney, Agent, or Firm* — Dority & Manning, P.A.

(57) ABSTRACT

A methods for soil clod detection within a field is provided herein and can include receiving, with a computing system, data indicative of terrain variations within a region of an agricultural field. The region of the field is comprised of one or more adjacently positioned segments. The method can also include generating, with the computing system, a mean reference line. The method can further include calculating, with the computing system, a segment height for each of the one or more adjacently positioned segments. The method can also include determining, with the computing system, a presence of an object based on a deviation of one of the one or more segment heights being greater than a threshold height from the reference line.

20 Claims, 12 Drawing Sheets

(56) References Cited

U.S. PATENT DOCUMENTS

| | | | |
|---|---|---|---|
| 9,945,832 B2 | 4/2018 | Trobat et al. | |
| 10,813,272 B2 * | 10/2020 | Stanhope | A01B 49/027 |
| 11,624,829 B2 * | 4/2023 | Dasika | A01B 69/001 |
| | | | 356/4.01 |
| 11,730,075 B2 * | 8/2023 | Ferrari | G01S 13/42 |
| | | | 701/50 |
| 2016/0029547 A1 | 2/2016 | Casper et al. | |
| 2018/0174291 A1 | 6/2018 | Asada et al. | |
| 2018/0206393 A1 | 7/2018 | Stoller et al. | |
| 2019/0059198 A1 | 2/2019 | Schnaider et al. | |
| 2019/0141880 A1 | 5/2019 | Zemenchik et al. | |

OTHER PUBLICATIONS

Chimi-Chiadjeu et al., "Automatic clod detection and boundary estimation from Digital Elevation Model images using different approaches," Catena 118, 73-83, Feb. 12, 2014, (11 pages) http://hebergement.u-psud.fr/hegarat-mascle/publications/ChimiChiadjeu_CATENA14.pdf.

* cited by examiner

SYSTEMS AND METHODS FOR SOIL CLOD DETECTION

FIELD OF THE INVENTION

The present subject matter relates generally to the acquisition and analysis of surface condition data associated with an agricultural field and, more particularly, to systems and methods for detecting objects within a field.

BACKGROUND OF THE INVENTION

Soil roughness generally refers to the roughness of soil in a field. Soil roughness is a product of or otherwise influenced by the number and size of soil clods included within the soil. Soil clods refer to portions of the soil that are denser than the surrounding soil, thereby forming a separate clod. For various reasons, it may be desired to maintain a given amount of soil roughness within a field before or following an agricultural operation. For example, when planting seeds it is generally not desired to have soil clods that are larger than a certain size.

As such, the ability to monitor and/or adjust the amount of soil roughness within a field can be pertinent to maintaining a healthy, productive field, particularly when it comes to performing tillage and/or planting operations. However, typical soil analysis may be time consuming, expensive, and data intensive. Accordingly, a system and method for detecting soil clods within a field would be welcomed in the technology.

BRIEF DESCRIPTION OF THE INVENTION

Aspects and advantages of the technology will be set forth in part in the following description, or may be obvious from the description, or may be learned through practice of the technology.

In some aspects, the present subject matter is directed to a method for determining soil clods within a field. The method includes receiving, with a computing system, data indicative of terrain variations within a region of an agricultural field, the region of the field being comprised of one or more adjacently positioned segments. The method also includes generating, with the computing system, a mean reference line, the mean reference line extending through a mean height of the region. The method further includes calculating, with the computing system, a segment height for each of the one or more adjacently positioned segments. Lastly, the method includes determining, with the computing system, a presence of an object based on a deviation of one of the one or more segment heights being greater than a threshold height from the reference line.

In some aspects, the present subject matter is directed to a system for determining one or more soil clods within a field. The system can include a field sensor configured to capture data of the field. The system further includes a computing system communicatively coupled to the field sensor. The computing system includes a processor and associated memory. The memory stores instructions that, when implemented by the processor, configure the computing system to receive the captured data from the field sensor of a first region of the field, the first region of the field including one or more first segments, determine a height between the field sensor and the field for each of the one or more first segments within the first region of the field, generate a first terrain plot indicative of a distance between the field sensor and each of the one or more first segments within the first region of the field, generate a first reference line based on the first terrain plot, wherein a first segment has a negative height relative to the reference line and a second segment has a positive height relative to the reference line, and identify an object within the one or more first segments of the first terrain plot as a soil clod based on the second height exceeding a defined threshold.

In some aspects, the present subject matter is directed to a system for an agricultural machine. The system includes a field sensor configured to capture data of a region of a field. A computing system is communicatively coupled to the field sensor. The computing system includes a processor and associated memory. The memory stores instructions that, when implemented by the processor, configure the computing system to receive the captured data from the field sensor of the region of the field, the region of the field including one or more segments, generate a reference line, wherein a first segment has a negative height relative to the reference line and a second segment has a positive height relative to the reference line, and identify the one or more segments of the region as an object based on the second height exceeding a defined threshold from the reference line.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
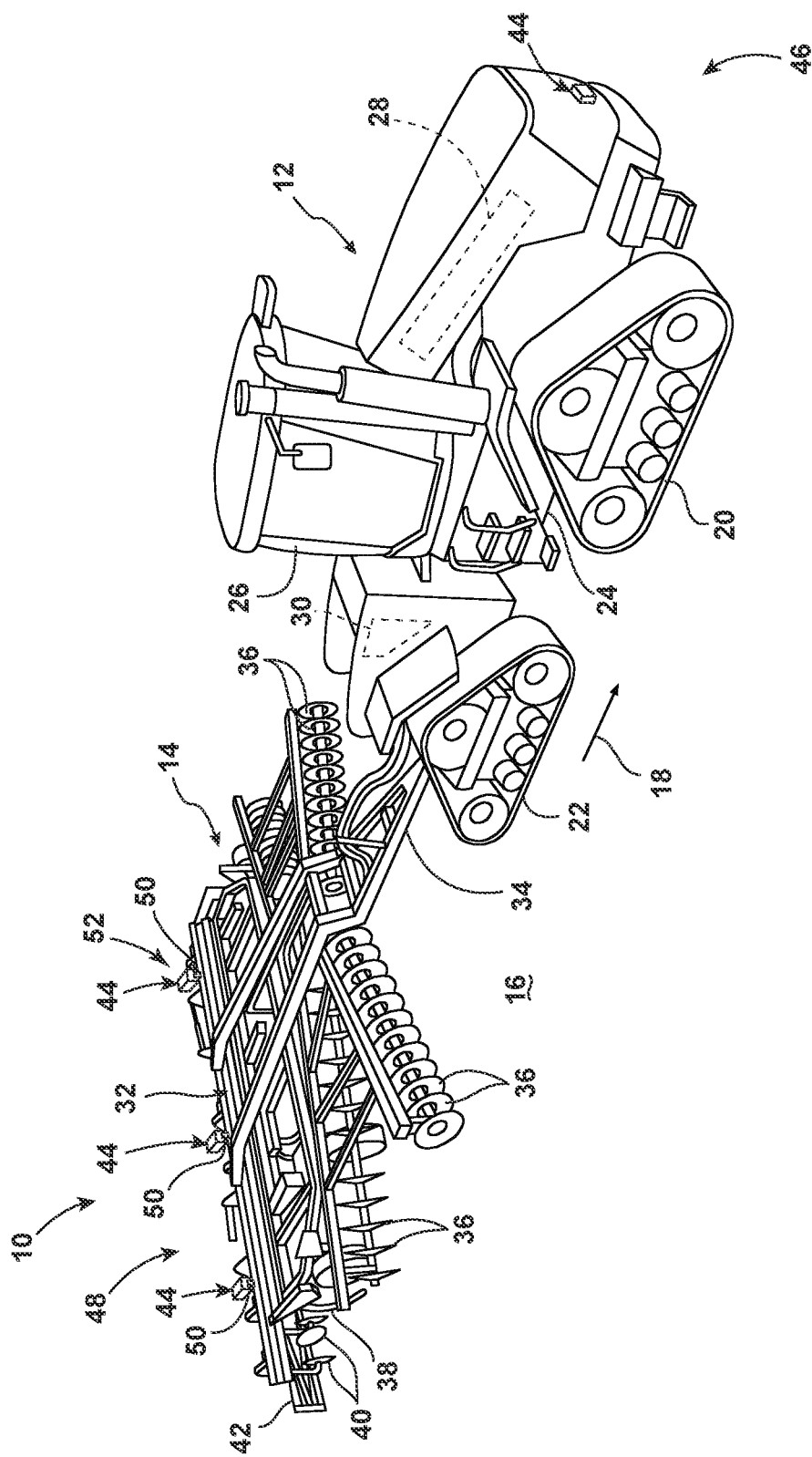
FIG. 1 illustrates a front perspective view of an agricultural machine in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for detecting soil clods within an agricultural field. As will be described below, a soil clod is generally characterized by a portion of soil that is denser than the surrounding soil, thereby forming a separate clod or other object that extends above a nominal height of the soil surface or other reference point or plane by a given height. Such soil clods can result in an undesirable circumstances that can impact subsequent agricultural operations within the field (e.g., a subsequent planting operation). For example, when planting seeds, it is generally not desired to have soil clods that are larger than a certain size.

In accordance with aspects of the present subject matter, the disclosed systems and methods utilize data processing algorithms to detect soil clods within regions of an agricultural field. In several embodiments, one or more field sensor(s) are used to capture data of a region of a field. The region of field may include various objects and/or a ground surface within the field. A computing system is communicatively coupled to the one or more field sensor(s). In some instances, the one or more field sensor(s) may be configured as a lidar system.

The computing system is configured to receive the captured data from the field sensor(s) of the region of the field. In several examples, the region of the field can include one or more first segments. The computing system is further configured to determine a height between the field sensor and the field for each of the one or more segments within the first region of the field. The computing system may further be configured to generate a terrain plot indicative of a distance between the field sensor and each of the one or more segments within the region of the field.

The computing system may also be configured to generate a first reference line based on the first terrain plot. A first segment has a negative height relative to the reference line and a second segment has a positive height relative to the reference line. As such, the reference line may be generally linear and/or offset from a ground surface of the field (or one or more segments). The computing system may identify the one or more first segments of the first terrain plot as a soil clod based on the second height exceeding a defined threshold. By using a reference line that is offset from the ground surface, movement of the implement may have a smaller effect on errors caused by movement of the implement as the agricultural machine traverses the field. In addition, the field sensor(s) may utilize various data acquisition techniques that allow for the detection of terrain during low visibility conditions, which may include dusty conditions, low light conditions, and/or any other condition.

Figure 2:
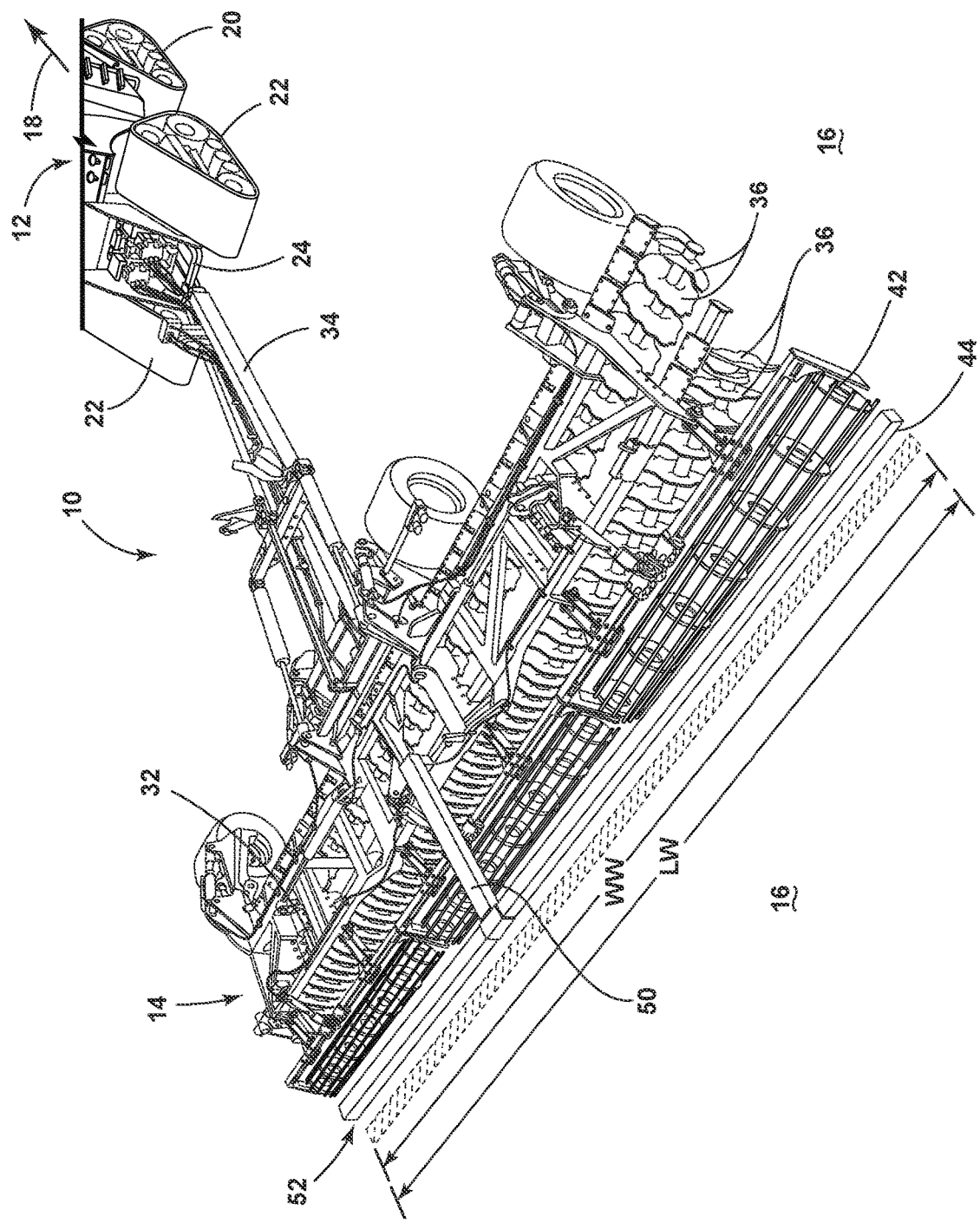
FIG. 2 illustrates a rear perspective view of an agricultural machine in accordance with aspects of the present subject matter.
Figure 3:
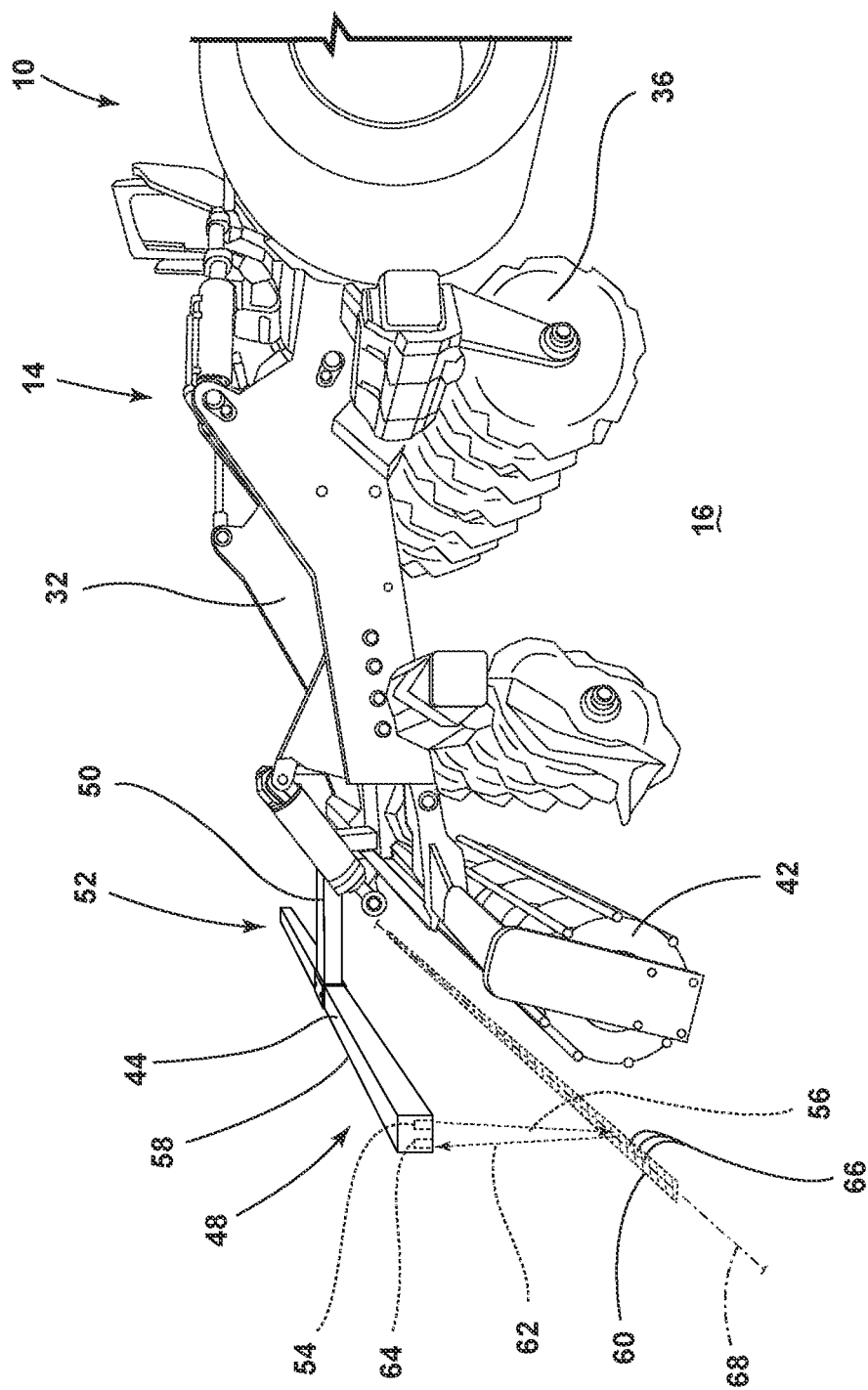
FIG. 3 illustrates a partial side perspective view of an agricultural machine in accordance with aspects of the present subject matter.

Referring now to drawings, FIGS. 1-3 respectively illustrate a front perspective view, a rear perspective view, and a partial side perspective view of an agricultural machine 10 in accordance with various aspects of the present subject matter. As shown, the agricultural machine 10 can include a work vehicle 12 and an associated agricultural implement 14. In general, the work vehicle 12 is configured to tow the implement 14 across a field 16 in a direction of travel (e.g., as indicated by arrow 18 in FIG. 1). In the illustrated examples, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, the agricultural machine 10 may correspond to any suitable powered and/or unpowered agricultural machine 10 (including suitable vehicles and/or equipment, such as only a work vehicle or only an implement). Additionally, the agricultural machine 10 may include two or more associated vehicles, implements, and/or the like (e.g., a tractor, a planter, and an associated air cart).

As shown in FIGS. 1-3, the work vehicle 12 includes a pair of front track assemblies 20, a pair of rear track assemblies 22, and a frame or chassis 24 coupled to and supported by the track assemblies 20, 22. An operator's cab 26 may be supported by a portion of the chassis 24 and may house various input devices for permitting an operator to control the operation of one or more components of the work vehicle 12 and/or one or more components of the implement 14. Additionally, the work vehicle 12 may include a power plant 28 and a transmission 30 mounted on the chassis 24. The transmission 30 may be operably coupled to the power plant 28 and may provide variably adjusted gear ratios for transferring power to the track assemblies 20, 22 via a drive axle assembly (or via axles if multiple drive axles are employed).

Additionally, as shown in FIGS. 1-3, the implement 14 may generally include a carriage frame assembly 32 configured to be towed by the work vehicle 12 via a pull hitch or tow bar 34 in the direction of travel 18 of the vehicle 12. The carriage frame assembly 32 may be configured to support a plurality of ground-engaging tools, such as a plurality of shanks, disk blades, leveling blades, basket assemblies, tines, spikes, and/or the like. For example, the carriage frame assembly 32 may be configured to support various gangs of disc blades 36, a plurality of ground engaging shanks 38, a plurality of leveling blades 40, and a plurality of crumbler wheels or basket assemblies 42. However, in alternative embodiments, the carriage frame assembly 32 may be configured to support any other suitable ground engaging tools and/or a combination of ground engaging tools. In several embodiments, the various ground-engaging tools may be configured to perform a tillage operation or any other suitable ground-engaging operation across the field 16 along which the implement 14 is being towed. It should be understood that, in addition to being towed by the work vehicle 12, the implement 14 may also be a semi-mounted implement connected to the work vehicle 12 via a two-point hitch or the implement 14 may be a fully mounted implement (e.g., mounted the work vehicle's 12 three-point hitch).

It will be appreciated that the configuration of the agricultural machine 10 described above and shown in FIGS. 1-3 is provided only to place the present subject matter in an exemplary field of use. Thus, it will be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 12 or rely on tires/wheels in lieu of the track assemblies 20, 22. Similarly, as indicated above, the carriage frame assembly 32 of the implement 14 may be configured to support any other suitable combination of type of ground-engaging tools.

Furthermore, in accordance with aspects of the present subject matter, the agricultural machine 10 may include one or more field sensor(s) 44 coupled thereto and/or supported thereon. Each field sensor(s) 44 may, for example, be configured to capture data relating to one or more conditions of the field 16 along which the machine 10 is being traversed. For example, in several embodiments, the field sensor(s) 44 may be used to collect data associated with one or more features of the field 16, such as one or more conditions relating to crop residue, soil clods, and/or surface irregularities (e.g., ridges and/or valleys) within the field 16. For instance, as will be described below, the field sensor(s) 44 may be used to collect data associated with the detection of soil clods within the field 16.

With further reference to FIGS. 1-3, the field sensor(s) 44 may be provided in operative association with the agricultural machine 10 such that the field sensor(s) 44 has a field of view directed towards a region(s) 60 of the field 16 adjacent to the work vehicle 12 and/or the implement 14, such as a region(s) 60 of the field 16 disposed in front of, behind, and/or along one or both of the sides of the work vehicle 12 and/or the implement 14. For example, as shown in FIG. 1, in some embodiments, a field sensor(s) 44 may be provided at a forward end portion 46 of the work vehicle 12 to allow the field sensor(s) 44 to capture images and related data of a section of the field 16 disposed in front of the work vehicle 12. Such a forward-located field sensor(s) 44 may allow pre-tillage images of the field 16 to be captured for monitoring or determining surface conditions of the field 16 (e.g., soil clods) prior to the performance of a tillage operation. Similarly, as shown in FIGS. 1-3, a second field sensor(s) 44 may be provided at or adjacent to an aft end portion 48 of the implement 14 to allow the field sensor(s)

44 to capture images and related data of a section of the field 16 disposed behind the implement 14. Such an aft-located field sensor(s) 44 may allow post-tillage images of the field 16 to be captured for monitoring or determining surface conditions of the field 16 (e.g., soil clods) after the performance of a tillage operation.

Additionally or alternatively, the field sensor(s) 44 may be installed at any other suitable location(s) on the work vehicle 12 and/or the implement 14. In addition, the agricultural machine 10 may only include a single field sensor(s) 44 mounted on either the work vehicle 12 or the implement 14 or may include more than two field sensor(s) 44 mounted on the work vehicle 12 and/or the implement 14. Moreover, it will be appreciated that each field sensor(s) 44 may be configured to be mounted or otherwise supported relative to a portion of the agricultural machine 10 using any suitable mounting/support structure. For instance, each field sensor (s) 44 may be directly or indirectly mounted to a portion of the work vehicle 12 and/or the implement 14.

In some embodiments, a suitable mounting structure 50 (e.g., mounting arms, brackets, trays, etc.) may be used to support each field sensor(s) 44 behind the implement 14 (e.g., in a cantilevered arrangement) to allow the field sensor(s) 44 to obtain the desired field of view, including the desired orientation of the device's field of view relative to the field 16.

Referring further to FIGS. 1-3, in general, the field sensor(s) 44 may correspond to any suitable device(s) or other assembly configured to capture data of the field 16. For instance, in several embodiments, the field sensor(s) 44 may correspond to a lidar system 52, which may be used for three-dimensional imaging. The lidar system 52 can include one or more radiation sources 54, such as laser sources, operative to emit a pulse of radiation 56, which may be positioned within a housing 58. The pulse of radiation 56 may be directed towards a region 60 of the field 16, and/or in any other direction. A portion 62 of the pulse of radiation 56 is reflected off of the region 60 of the field 16 (and/or objects within the region 60 of the field 16) toward a photodetector 64, which may also be within, or separated from, the housing 58. The photodetector 64 is configured to receive and detect the portion 62 of the pulse of radiation 56 reflected off of the region 60 of the field 16 (and/or objects within the region 60 of the field 16).

In some instances, the region 60 may be comprised of one or more segments with the number of segments defining a "resolution" of the field sensor. In use, the field sensor(s) 44 may be configured to detect a feature, such as a height relative to a reference point, within each segment. The region 60 may be generally linear and positioned rearwardly (and/or in any other position) of the implement 14. In some examples, the region 60 may generally define a longitudinal centerline. In various examples, the longitudinal centerline may be generally perpendicular (or oriented in any other manner) relative to the direction of forward travel 18 of the machine 10.

In various examples, the region 60 may generally extend a latitudinal (direction transverse to the direction of forward travel 18 of the machine 10) width lw that is generally equal (e.g., ±10%) to a working width ww of the implement 14, a latitudinal width lw that is less than the working width ww of the implement 14, and/or a latitudinal width lw that is greater than the working width ww of the implement 14. In addition, the region 60 may have a longitudinal length (direction parrel to the direction of forward travel 18 of the machine 10) of any practicable width. As used herein, the working width may be defined as a width between the outboard ground engaging tools of the implement 14.

The pulse of radiation 56 may be of a short duration, for example, 100 ns pulse width. The lidar system 52 further includes componentry configured to determine a time of flight of the pulse of radiation 56 from emission to detection. Since the pulse of radiation 56 travels at the speed of light, a distance between the lidar system 52 and the region 60 of the field 16 may be determined based on the determined time of flight. By determining the time of flight for each pulse of radiation 56 emitted at a respective emission location, the distance from the lidar system 52 to an upper surface of each segment may be determined. Based on the emission location, the location of the scanned region 60 of the field 16 may also be determined based on the location and the distance to the lidar system 52. Thus, a three-dimensional image of the field 16 may be constructed based on the measured distances from the lidar system 52 to various segments. In some embodiments, a three-dimensional image point cloud, e.g., a set of X, Y, and Z coordinates of the segments may be generated.

With the data provided by the field sensor, terrain variations may be plotted. Based on the terrain variations in the plot 250 (FIG. 7), objects may be identified. Based on the size of the identified objects, some of the objects may be identified as soil clods while other objects may be identified as not soil clods. In addition, a number of soil clods may be determined and/or sorted based on size. In some instances, when the size and/or amount of soil clods exceeds a desired amount, manual or automatic manipulation of the machine 10 may be performed to alter the size and/or amount of soil clods. It will be appreciated that, in addition to a lidar assembly or as an alternative thereto, the agricultural machine 10 may include any other suitable type of field sensor(s) 44. For instance, suitable field sensor(s) 44 may also include an ultrasonic sensor, a radio detection and ranging (RADAR) sensor, a sound navigation and ranging (SONAR) sensor, a vision-based sensor, and/or any other practicable sensor.

Figure 4:
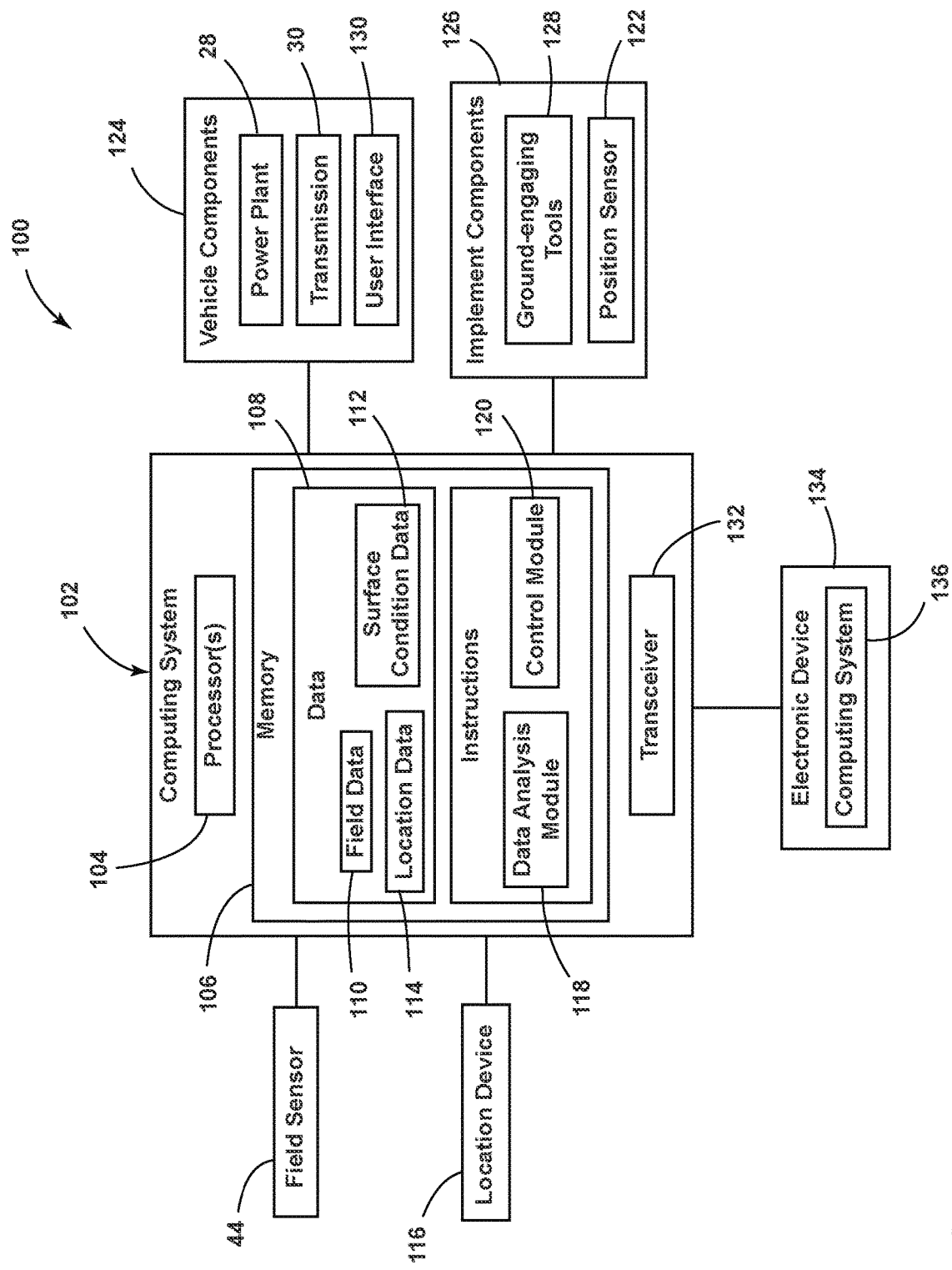
FIG. 4 illustrates a block diagram of components of a system for capturing data of a field in accordance with aspects of the present subject matter.

Referring now to FIG. 4, a schematic view of a system 100 for monitoring one or more surface conditions associated with a field 16 is illustrated in accordance with aspects of the present subject matter. In several embodiments, the disclosed system 100 is configured for detecting soil clods within an agricultural field 16. The system 100 will generally be described herein with reference to the agricultural machine 10 described above with reference to FIGS. 1-3. However, the disclosed system 100 may generally be utilized with agricultural machines having any other suitable machine configuration.

As shown in FIG. 4, the system 100 may include one or more field sensor(s) 44 configured to capture data of a region(s) 60 of the field 16 disposed adjacent to the work vehicle 12 and or the implement 14. Additionally, the system 100 may include or be associated with one or more components of the agricultural machine 10 described above with reference to FIGS. 1-3, such as one or more components of the work vehicle 12 and/or the implement 14.

The system 100 may further include a computing system 102 communicatively coupled to the field sensor(s) 44. In several embodiments, the computing system 102 may be configured to receive and process the data captured by the field sensor(s) 44 to allow a feature, such as a height relative to a reference point, within each segment of the field 16 to be determined. For instance, the computing system 102 may be configured to execute one or more suitable data processing algorithms for detecting the presence of soil clods within the field 16.

In general, the computing system 102 may include any a suitable processor-based device, such as a computing device or any suitable combination of computing devices. Thus, in several embodiments, the computing system 102 may include one or more processors 104 and associated memory 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 of the computing system 102 may generally comprise memory element(s) including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store suitable computer-readable instructions that, when implemented by the processor 104, configure the computing system 102 to perform various computer-implemented functions, such as one or more aspects of the data processing algorithm(s) and/or related method(s) described below. In addition, the computing system 102 may also include various other suitable components, such as a communications circuit or module, one or more input/output channels, a data/control bus, and/or the like.

It will be appreciated that, in several embodiments, the computing system 102 may correspond to an existing controller of the agricultural machine 10, or the computing system 102 may correspond to a separate processing device. For instance, in some embodiments, the computing system 102 may form all or part of a separate plug-in module or computing device that is installed relative to the work vehicle 12 or implement 14 to allow for the disclosed system 100 and method to be implemented without requiring additional software to be uploaded onto existing control devices of the work vehicle 12 or implement 14.

In several embodiments, the memory 106 of the computing system 102 may include one or more databases 108 for storing information received and/or generated by the computing system 102. For instance, as shown in FIG. 4, the memory 106 may include a field database 110 storing data associated with the field data captured by the field sensor(s) 44, including the captured data and/or data deriving from the captured data (e.g., disparity maps, depth images generated based on the captured data by the field sensor(s) 44, etc.). Additionally, the memory 106 may include a surface condition database 112 storing data associated with the surface condition(s) being monitored by the computing system 102. For instance, as indicated above, the captured data and related data deriving from the field sensor(s) 44 may be used to detect the present soil clods within the field 16. In such instances, any related "soil clod" data generated by the computing system 102 may be stored within the surface condition database 112 for subsequent processing and/or analysis.

Additionally or alternatively, as shown in FIG. 4, the memory 210 may also include a location database 114, which may be configured to store location data 218 generated by a location device 116 that is stored in association with the field data 216 for later use in geo-locating the field data 216 relative to the field 16. In some embodiments, the location device 116 may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the machine 10.

Moreover, as shown in FIG. 4, in several embodiments, the instructions stored within the memory 106 of the computing system 102 may be executed by the processor 104 to implement a data analysis module 118. In general, the data analysis module 118 may be configured to process/analyze the captured data received from the field sensor(s) 44 and/or the data deriving therefrom to estimate or determine one or more features associated with the field 16. In several embodiments, the data analysis module 118 may be configured to execute one or more data processing algorithms to allow soil clods to be identified by the computing system 102. For example, in some embodiments, the computing system 102 may be configured to receive the captured data from the field sensor(s) 44 of the region 60 of the field 16, generate a reference line, wherein a first segment has a negative height relative to the reference line and a second segment has a positive height relative to the reference line and identify the one or more segments of the region 60 as an object based on the second height exceeding a defined threshold from the reference line.

Referring still to FIG. 4, in some embodiments, the instructions stored within the memory 106 of the computing system 102 may also be executed by the processor 104 to implement a control module 120. In general, the control module 120 may be configured to electronically control the operation of one or more components of the agricultural machine 10. For instance, in several embodiments, the control module 120 may be configured to control the operation of the agricultural machine 10 based on the monitored surface condition(s) of the field 16. Such control may include controlling the operation of one or more components 124 of the work vehicle 12, such as the power plant 28 and/or the transmission 30 of the vehicle 12 to automatically adjust the ground speed of the agricultural machine 10. In addition (or as an alternative thereto), the control module 120 may be configured to electronically control the operation of one or more components 126 of the implement 14. For instance, the control module 120 may be configured to adjust the operating parameters (e.g., penetration depth, down force/pressure, etc.) associated with one or more of the ground-engaging tools 128 of the implement 14 (e.g., the disc blades 36, shanks 38, leveling blades 40, and/or basket assemblies 42) to proactively or reactively adjust the operation of the implement 14 in view of the monitored surface condition(s).

In instances in which one or more operating parameters are adjusted, a position sensor 122 operably coupled with the machine 10 may detect the change in position. The position may, in turn, may be used by the computing system 102 to determine a distance between the field sensor(s) 44 and the field 16 at various points within the region 60 of the field 16 and/or objects within the region 60 of the field 16). In some examples, the position sensor 122 may be configured as an inertial measurement unit (IMU) that measures a specific force, angular rate, and/or an orientation of the implement 14 using a combination of accelerometers, gyroscopes, magnetometers, and/or any other practicable device. The accelerometer may correspond to one or more multi-axis accelerometers (e.g., one or more two-axis or three-axis accelerometers) such that the accelerometer may be configured to monitor the movement of the implement 14 in multiple directions, such as by sensing the implement acceleration along three different axes. It will be appreciated, however, that the accelerometer may generally correspond to any suitable type of accelerometer without departing from the teachings provided herein.

In some instances, the computing system 102 may be configured to receive the captured data from the field sensor(s) 44 of a first region 60 of the field 16, the first region 60 of the field 16 including one or more first segments, determine a height between the field sensor(s) 44 and the field 16 for each of the one or more first segments within the first region 60 of the field 16, generate a first terrain plot 250 (FIG. 7) indicative of a distance between the field sensor(s) 44 and each of the one or more first segments within the first region 60 of the field 16, generate a first reference line based on the first terrain plot 250, wherein a first segment has a negative height relative to the reference line and a second segment has a positive height relative to the reference line and identify an object within the one or more first segments of the first terrain plot 250 as a soil clod based on the second height exceeding a defined threshold. The computing system 102 may further be configured to determine vertical movement of the field sensor, which may be based on the position sensor 122 and/or through any other method. In some instances, the computing system 102 is further configured to receive the captured data from the field sensor(s) 44 of a second region 60 of the field 16, the second region 60 of the field 16 including one or more second segments, determine a height between the field sensor(s) 44 and the field 16 for each of the one or more second segments within the second region 60 of the field 16, generate a second terrain plot 250 indicative of a distance between the field sensor(s) 44 and each of the one or more second segments within a second region 60 of the field 16, and generate a second reference line based on the terrain plot 250, wherein a second segment has a negative height relative to the reference line and a second segment has a positive height relative to the reference line. The vertical movement can be the difference between the first reference line and the second reference line.

In several embodiments, the computing system 102 may also include a transceiver 132 to allow for the computing system 102 to communicate various components. For instance, one or more communicative links or interfaces (e.g., one or more data buses) may be provided between the transceiver 132 and a user interface 130, an electronic device 134, and/or any other device.

The user interface 130 may be housed within the cab 26 of the work vehicle 12 or at any other suitable location. The user interface 130 may be configured to provide feedback to the operator of the agricultural machine 10. Thus, the user interface 130 may include one or more feedback devices, such as display screens, speakers, warning lights, and/or the like, which are configured to communicate such feedback. In addition, some embodiments of the user interface 130 may include one or more input devices, such as touchscreens, keypads, touchpads, knobs, buttons, sliders, switches, mice, microphones, and/or the like, which are configured to receive user inputs from the operator.

The electronic device 134 may include a display for displaying information to a user. For instance, the electronic device 134 may display one or more user interfaces and may be capable of receiving remote user inputs. In addition, the electronic device 134 may provide feedback information, such as visual, audible, and tactile alerts, and/or allow the operator to alter or adjust one or more components of the agricultural machine 10 through the usage of the remote electronic device 134. The electronic device 134 may include a variety of computing systems 136 including a processor and memory. For example, the electronic device 134 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

It will be appreciated that, although the various control functions and/or actions will generally be described herein as being executed by the computing system 102, one or more of such control functions/actions (or portions thereof) may be executed by a separate computing system or may be distributed across two or more computing systems (including, for example, the computing system 102 and a separate computing system). For instance, in some embodiments, the computing system 102 may be configured to acquire data from the field sensor(s) 44 for subsequent processing and/or analysis by a separate computing system (e.g., a computing system 154 (FIG. 5) associated with a remote server 150). In other embodiments, the computing system 102 may be configured to execute the data analysis module 118 to determine and/or monitor one or more surface conditions within the field 16, while a separate computing system (e.g., a vehicle computing system 102 associated with the agricultural machine 10) may be configured to execute the control module 120 to control the operation of the agricultural machine 10 based on data and/or instructions transmitted from the computing system 102 that are associated with the monitored surface condition(s).

Figure 5:
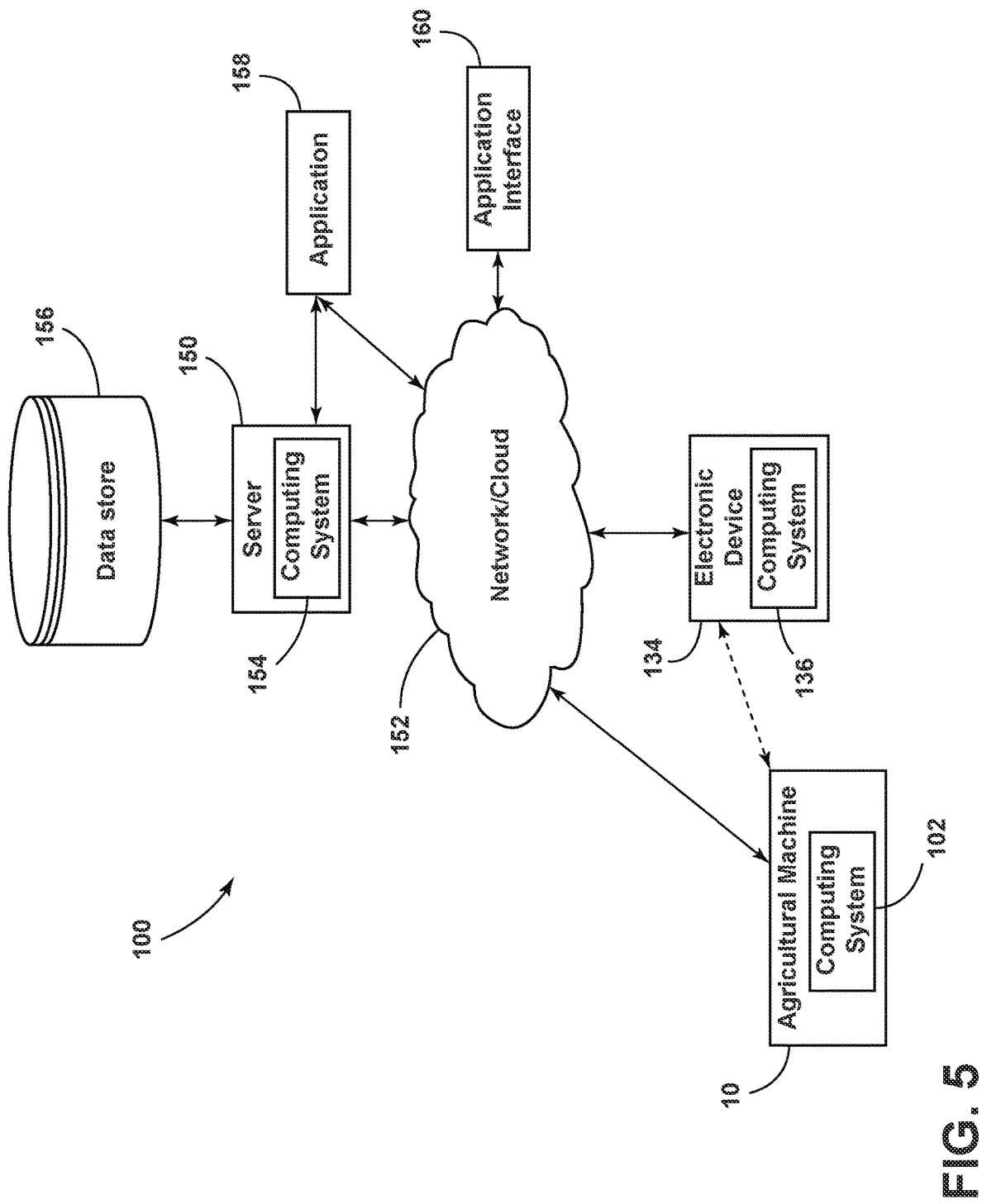
FIG. 5 is a block diagram illustrating the agricultural machine operably coupled with a remote server in accordance with aspects of the present subject matter.

Referring to FIG. 5, in some examples, the agricultural machine 10 and/or the electronic device 134 may be communicatively coupled with one another and/or one or more remote sites, such as a remote server 150 via a network/cloud 152 to provide data and/or other information therebetween. The network/cloud 152 represents one or more systems by which the agricultural machine 10 and/or the electronic device 134 may communicate with the remote server 150. The network/cloud 152 may be one or more of various wired or wireless communication mechanisms, including any desired combination of wired and/or wireless communication mechanisms and any desired network topology (or topologies when multiple communication mechanisms are utilized). Exemplary communication networks 152 include wireless communication networks (e.g., using Bluetooth, IEEE 802.11, etc.), local area networks (LAN) and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 152 in FIG. 5). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 152.

The server 150 may be one or more computer servers, each of which may include a computing system 154 including at least one processor and at least one memory, the memory storing instructions executable by the processor, including instructions for carrying out various steps and processes. The server 150 may include or be communicatively coupled to a data store 156 for storing collected data as well as instructions and/or data for the agricultural machine 10 and/or the electronic device 134 with or without intervention from a user, the agricultural machine 10, and/or the electronic device 134. Moreover, the server 150 may be capable of analyzing initial or raw sensor data received from the agricultural machine 10, and final or post-processing data (as well as any intermediate data created during data processing). Accordingly, the instructions and/or data provided to any of the agricultural machine 10 and/or the electronic device 134 may be determined and generated by the server 150 and/or one or more cloud-based applications 272. In such instances, the user interface 130 of the agricultural machine 10 and/or the electronic device 134 may be a dummy device that provides various instructions and/or data based on instructions from the network/cloud 152.

With further reference to FIG. 5, the server 150 also generally implements features that may enable the agricultural machine 10 and/or the electronic device 134 to communicate with cloud-based applications 272. Communications from the electronic device 134 can be directed through the network/cloud 152 to the server 150 and/or cloud-based applications 272 with or without a networking device, such as a router and/or modem. Additionally, communications from the cloud-based applications 272, even though these communications may indicate one the agricultural machine 10 and/or the electronic device 134 as an intended recipient, can also be directed to the server 150. The cloud-based applications 272 are generally any appropriate services or applications 272 that are accessible through any part of the network/cloud 152 and may be capable of interacting with the electronic device 134.

In various examples, the agricultural machine 10 and/or the electronic device 134 can be feature-rich with respect to communication capabilities, i.e. have built-in capabilities to access the network/cloud 152 and any of the cloud-based applications 272 or can be loaded with, or programmed to have such capabilities. The agricultural machine 10 and/or the electronic device 134 can also access any part of the network/cloud 152 through industry-standard wired or wireless access points, cell phone cells, or network nodes. In some examples, users can register to use the remote server 150 through the agricultural machine 10 and/or the electronic device 134, which may provide access to the agricultural machine 10 and/or the electronic device 134 and/or thereby allow the server 150 to communicate directly or indirectly with the agricultural machine 10 and/or the electronic device 134. In various instances, the agricultural machine 10 and/or the electronic device 134 may also communicate directly, or indirectly, with the agricultural machine 10 and/or the electronic device 134 or one of the cloud-based applications 272 in addition to communicating with or through the server 150. According to some examples, the agricultural machine 10 and/or the electronic device 134 can be preconfigured at the time of manufacture with a communication address (e.g. a URL, an IP address, etc.) for communicating with the server 150 and may or may not have the ability to upgrade or change or add to the preconfigured communication address.

Referring still to FIG. 5, when a new cloud-based application 158 is developed and introduced, the server 150 can be upgraded to be able to receive communications for the new cloud-based application 158 and to translate communications between the new protocol and the protocol used by the agricultural machine 10 and/or the electronic device 134. The flexibility, scalability, and upgradeability of current server technology render the task of adding new cloud-based application protocols to the server 150 relatively quick and easy.

In several embodiments, an application interface 160 may be operably coupled with the cloud 152 and/or the application 158. The application interface 160 may be configured to receive data related to the agricultural machine 10 and/or the electronic device 134. In various embodiments, one or more inputs related to the field data 246 (FIG. 3) may be provided to the application interface 160. For example, a farmer, a vehicle user, a company, or other persons may access the application interface 160 to enter the inputs related to the field data 246. Additionally or alternatively, the inputs related to the field data 246 may be received from a remote server 150. For example, the inputs related to the field data 246 may be received in the form of software that can include one or more objects, agents, lines of code, threads, subroutines, databases, application programming interfaces (APIs), or other suitable data structures, source code (human-readable), object code (vehicle-readable). In response, the system 100 may update any input/output based on the received inputs. The application interface 160 can be implemented in hardware, software, or a suitable combination of hardware and software, and which can be one or more software systems operating on a general-purpose processor platform, a digital signal processor platform, or other suitable processors.

In some examples, at various predefined periods and/or times, the agricultural machine 10 and/or the electronic device 134 may communicate with the server 150 through the network/cloud 152 to obtain the stored instructions and/or data, if any exist. Upon receiving the stored instructions and/or data, the agricultural machine 10 and/or the electronic device 134 may implement the instructions and/or data. In some instances, the agricultural machine 10 and/or the electronic device 134 can send event-related data to the server 150 for storage in the data store 156. This collection of event-related data can be accessed by any number of users, the agricultural machine 10, and/or the electronic device 134 to assist with application processes.

In various embodiments, the data used by the agricultural machine 10, the electronic device 134, the remote server 150, the data store 156, the application 158, the application interface 160, and/or any other component for any purpose may be based on data provided by the one or more field sensor(s) 44, the location device 116 operably coupled with the agricultural machine 10, and/or third-party data that may be converted into comparable data that may be used independently or in conjunction with data collected from the one or more field sensor(s) 44.

In various examples, the server 150 may implement machine learning engine methods and algorithms that utilize one or several machine learning techniques including, for example, decision tree learning, including, for example, random forest or conditional inference trees methods, neural networks, support vector vehicles, clustering, and Bayesian networks. These algorithms can include computer-executable code that can be retrieved by the server 150 through the network/cloud 152 and may be used to generate a predictive evaluation of the field 16. In some instances, the machine learning engine may allow for changes to a control output to be performed without human intervention.

Figure 6:
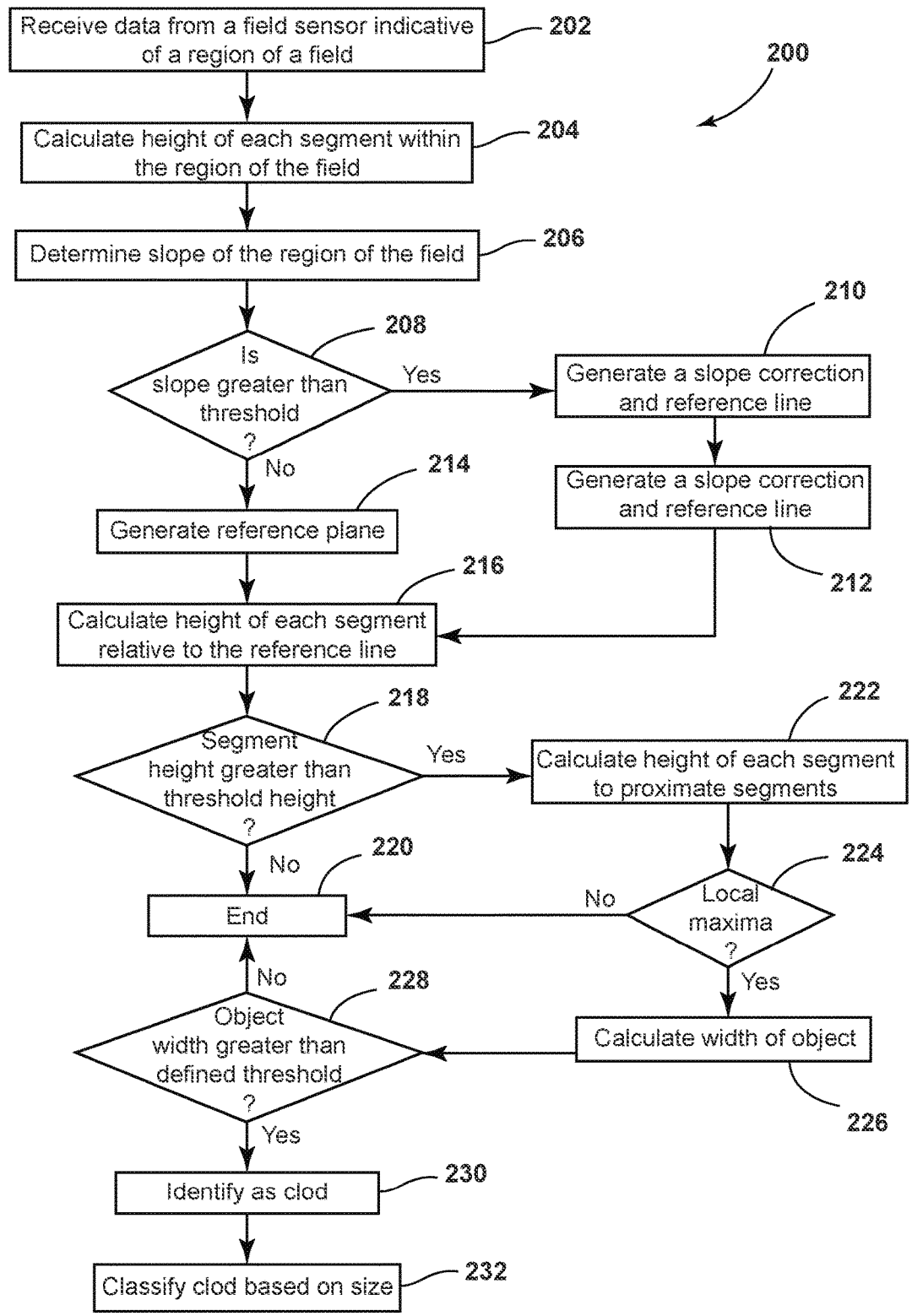
FIG. 6 illustrates a flow diagram providing example control logic for detecting soil clods in accordance with aspects of the present subject matter.

Referring now to FIG. 6, a flow diagram of example control logic 200 that may be executed by the system 100 (including any computing system 102, 136, 154 within the system and/or any other suitable computing system) for detecting soil clods within a field 16 (FIG. 1) is illustrated in accordance with aspects of the present subject matter. The control logic 200 shown in FIG. 6 is representative of steps of a data processing algorithm that can be executed to detect soil clods within the field with greater accuracy and without requiring substantial computing resources and/or processing time. Thus, in several embodiments, the control logic 200 may be utilized in association with a system 100 (FIG. 4) installed on or forming part of an agricultural machine to allow for real-time detection of soil clods within a field as the machine is being traversed across the field during the performance of an agricultural operation. In other embodiments, the control logic 200 may be used in association with any other suitable system, application, and/or the like for detecting soil clods within a field.

As shown in FIG. 6, at (202), the control logic 200 includes receiving data from one or more field sensor(s). For example, as indicated above, the computing system 102 (FIG. 3) may be communicatively coupled to the field sensor(s) 44 (FIG. 3), thereby allowing data captured by the field sensor(s) to be transmitted to and received by the computing system. In several embodiments, the data received may correspond to a region of the field that is formed from one or more segments.

Referring further to FIG. 6, at (204), the control logic 200 may also include calculating a height of each segment within the region of the field. As provided herein, the field sensor(s) may be any type of device that is configured to generate data indicative of a height of each segment within the region relative to a reference location. For instance, when the field sensor(s) are configured as a lidar system, one or more radiation sources may emit a pulse of radiation that travels at the speed of light. As such, a distance between the lidar system and each segment may be determined based on the determined time of flight. By determining the time of flight for each pulse of radiation emitted at a respective emission location, the distance from the lidar system to each corresponding segment may be determined.

Figure 7:
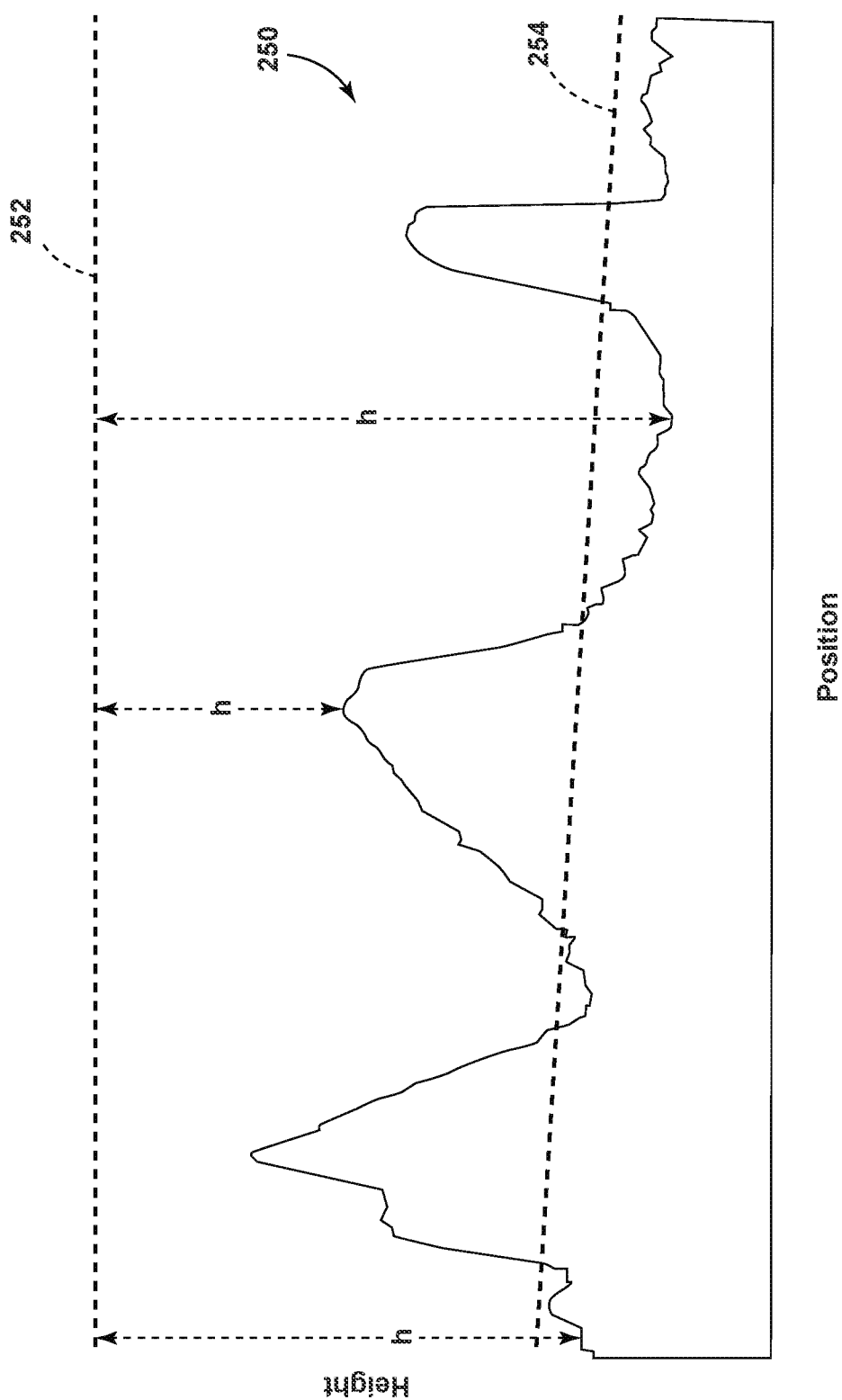
FIG. 7 illustrates a terrain plot of a sloped region of a field in accordance with aspects of the present subject matter.

For instance, FIG. 7 illustrates an example schematic diagram of a terrain plot 250 generated by the computing system based on the data provided by the one or more field sensor(s) with the height h of various segments of the region. As provided herein, the region may be partitioned into any number of segments, with the number of segments defining a resolution of the field sensor. In the example of FIG. 7, the segments may at least be narrow enough to indicate the terrain variations illustrated within the displayed region of the field.

Figure 8:
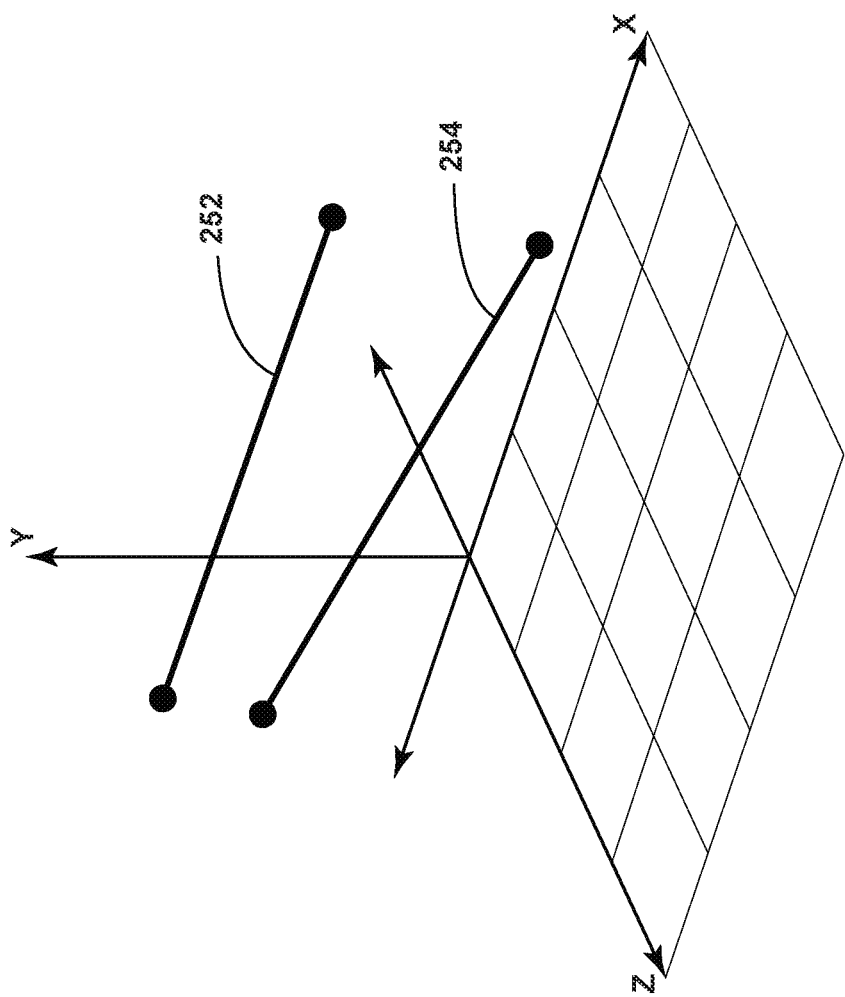
FIG. 8 illustrates a graph of the sloped region relative to an initial line in accordance with aspects of the present subject matter.

Referring further to FIG. 6, at (206), the control logic 200 may also include determining a slope of the region of the field relative to an initial line 252 or plane. In the examples provided herein, lines are illustrated, however, it will be appreciated that similar data may be generated in a three-dimensional space and compared to a plane without departing from the scope of the teachings provided herein. For instance, FIGS. 7 and 8 generally illustrate a slope of the region provided in FIG. 8 relative to a three-dimensional coordinate system. As illustrated, the region may have a lateral slope, and/or a slope in any other direction. In some instances, a slope line 254 may be based on the segment heights within the image. For example, the system 100 may be configured to use any practicable algorithm to determine a best fit slope line. It will be appreciated, however, that any other method may be used for generating a slope line 254 based on the segment heights within the image without departing from the scope of the present disclosure.

Referring further to FIG. 6, at (208), the control logic 200 may include determining if the slope line 254 exceeds a predefined threshold. If the slope does exceed the predefined threshold, at (210), the control logic 200 may include generating a slope correction. Further, at (212), the control logic 200 may include generating reference line 256 with the slope correction. If the slope does is equal to or less than the predefined threshold, at (214), the control logic 200 may include generating reference line 256. In either (212) or (214), the reference line 256 may be generally parallel to a ground surface of the region.

Figure 9:
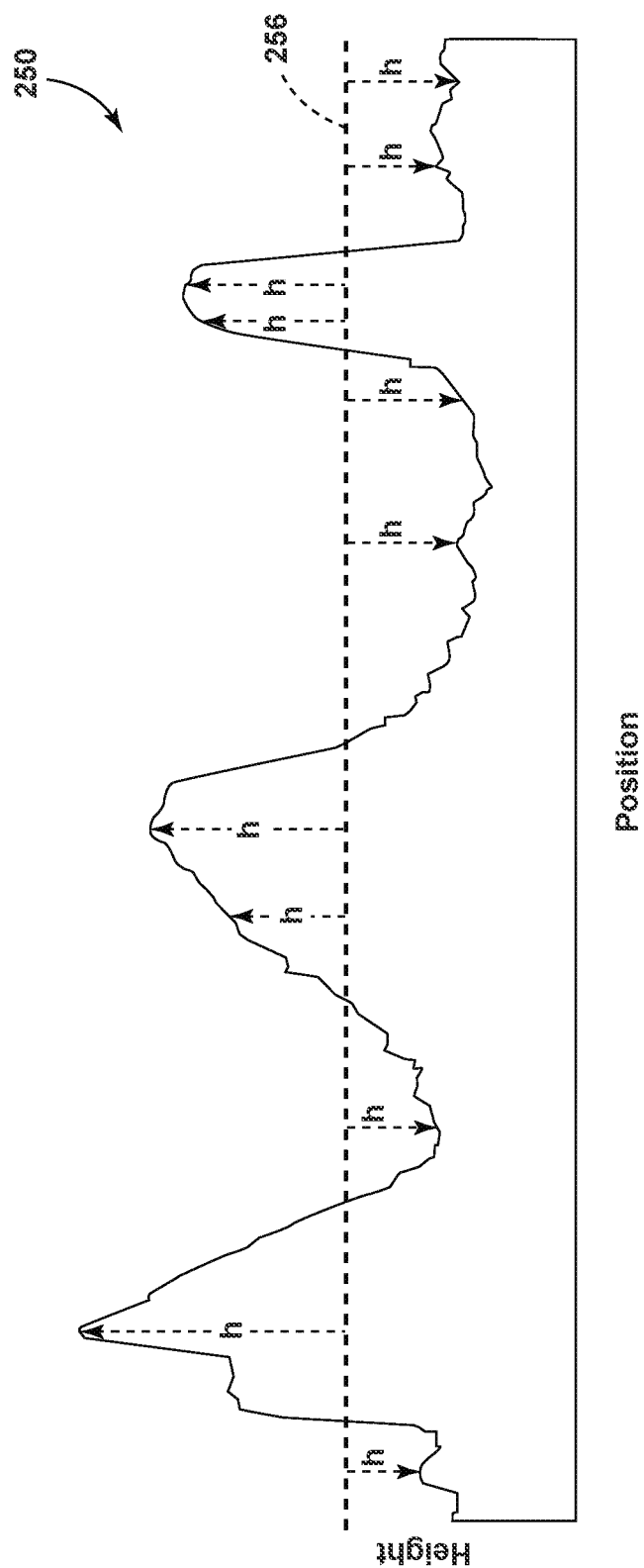
FIG. 9 illustrates a terrain plot and a reference line in accordance with aspects of the present subject matter.

As illustrated in FIG. 9, in some examples, the reference line 256 may extend through a mean of the heights of the segments of the region. In such instances, the mean reference line 256 may include one or more segments that extends above the reference line 256 and one or more segments that extend below the reference line 256. With reference to segment heights, the reference line 256 may be a height origin. As such, any height above the reference line 256 may be considered a positive height while any height below the reference line 256 may be considered a negative height.

With further reference to FIG. 6, at (216), the control logic 200 may include calculating a height of each segment within the region relative to the reference line 256. For instance, as illustrated in the example of FIG. 9, various segments have a positive height while other segments have a negative height.

Referring back to FIG. 6, at (218), the control logic 200 may include determining whether each segment height is greater than a defined threshold height 264. If the height of the segment is below the defined value, the control logic 200, at (220) determines that the segment is not a local maxima. If at (218), the control logic 200 determines that the segment height is greater than the defined threshold height 264, at (222), the control logic 200, may compare the height of the segment to proximate segments.

Figure 10:
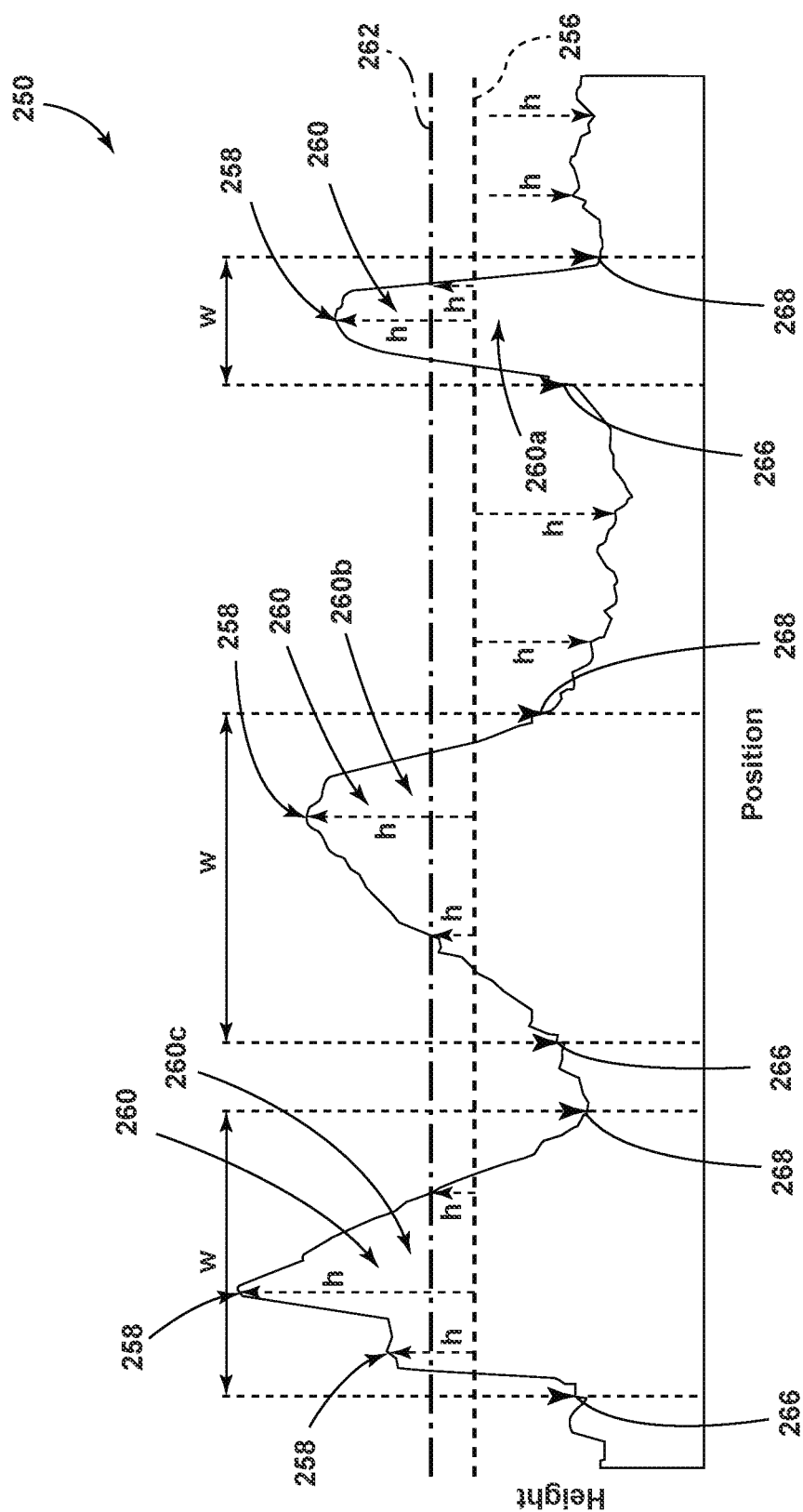
FIG. 10 illustrates the terrain plot and the reference line of FIG. 9 illustrating identified objects in accordance with aspects of the present subject matter.

At (224), the control logic 200 can determine if the segment is a local maxima, thereby indicating an object 260. The proximate segments may be laterally offset in the X-axis direction, as shown in FIG. 10, and/or in any other direction. If the segment is not a local maxima, the control logic 200 can end at (220).

At (226), once a local maxima has been determined, as generally indicated by arrows 258 in FIG. 10, the control logic 200 may determine a height of each segment that is proximate to the local maxima one or more directions. The heights of the proximate segments are calculated to determine a width of the object 260. In some instances, a first end portion 266 of the object 260 is determined when the height difference increases beyond a defined amount, when a best-fit slope of the adjacent heights is equal to a defined slope, when a change from a negative slope to a positive slope, when the change from a negative slope to a positive slope exceeds a defined amount, and/or when any other detection method occurs. Likewise, a second end portion 268 of the potential soil clod positioned on the opposing side of the local maxima from the first end portion 266 is determined when the height difference increases beyond a defined amount and/or a best-fit slope of the adjacent heights is equal to a defined slope. Once the first end point and the second end point are determined, a width of the potential clod may be calculated.

Referring back to FIG. 6, at (228), the control logic 200 can include determining whether the object 260 has a width that is greater than a defined threshold width. In some instances, various objects, such as stalks, may extend upwardly from the field. As such, by determining the threshold width, the control logic 200 may filter the data to predict the number of clods within the field.

If the object 260 has a width that is less than or equal to the threshold width, such as a first object 260*a* in FIG. 10, the control logic 200 may end at (220). If the object 260 has a width that is greater than the threshold width, such as a second object 260*b* and/or a third object 260*c* in FIG. 10, the control logic 200 may deem the object 260 a soil clod at (230).

Figure 11:
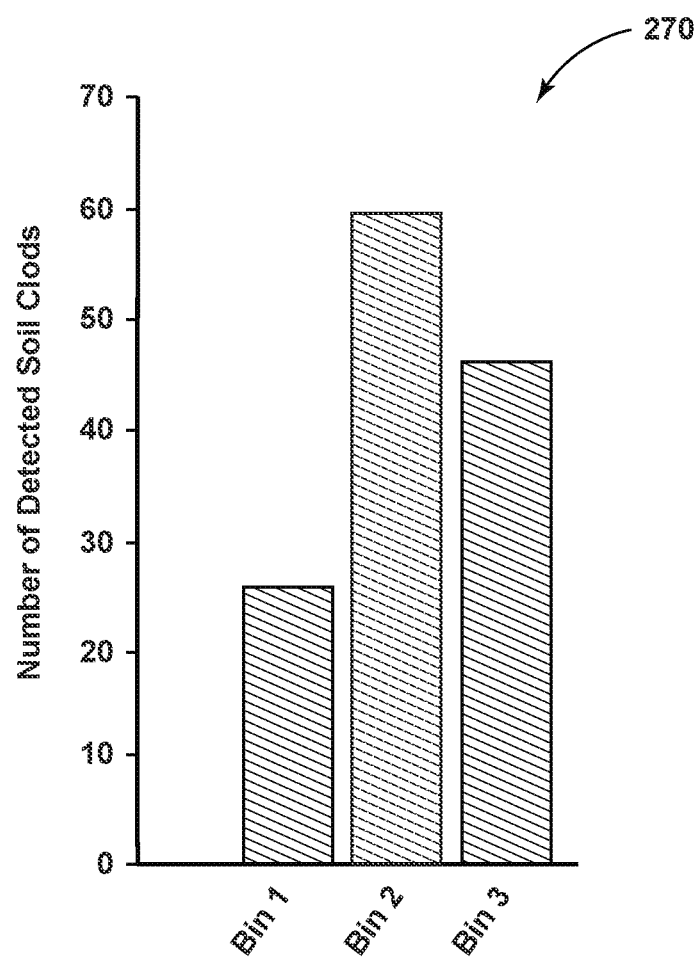
FIG. 11 illustrates a graph of soil clods sorted by size in accordance with aspects of the present subject matter.

Referring back to FIGS. 6 and 11, at (232), the control logic 200 includes classifying each of soil clods based on an area of each soil clod. In general, classification of the area of each soil clod may include placing each of the detected soil clods in various bins based on the area of each soil clod, the volume of each soil clod, and/or any other metric. For example, FIG. 11 illustrates a sample graph 270 of the detected soil clods within the region of the field classified based on size once each detected soil clod has been counted. For example, "Bin 1" may include soil clods of a first size range, "Bin 2" may include soil clods of a second size range that is greater than the first size range, and "Bin 3" may include soil clods of a third size range that is greater than the second size range. In some embodiments, the first size range, the second size range, and/or the third size range may correspond to operator-selected ranges based on observed conditions or a range that is calculated based on sensed surface conditions associated with the soil within the field. It will be appreciated that any number of bins/size ranges may be used without departing from the scope of the present disclosure. It will be appreciated that, upon detection of a soil clod meeting a predefined characteristic (e.g., a predefined size, shape, etc.) and/or a change in the number of soil clods meeting various characteristics, the computing system 102 may be configured to perform any number of follow-up actions, including storing data associated with the detected soil clod(s) within its memory 106 and/or transmitting such data to a separate computing device (e.g., a remote server and/or a computing device associated with a corresponding agricultural machine, such as a vehicle controller). Such actions may also include generating a notification for display to an operator (e.g., via the associated user interface 130) that provides information associated with the detection of the soil clod exceeding a predefined characteristic (e.g., a predefined size, shape, etc.) and/or a change in the number of soil clods exceeding various characteristics. For example, in some embodiments, if a detected soil clod does not exceed a first threshold based on a predefined characteristic (e.g., a predefined size, shape, etc.), the user interface 130 may overlay a first pattern/color (e.g., green) onto the location of the clod within the soil clod map 278 and/or display as such within any other graphic presented on the user interface 130. If a detected soil clod does exceed a first threshold but fails to exceed a second threshold based on a predefined characteristic (e.g., a predefined size, shape, etc.), the user interface 130 may overlay a second pattern/color (e.g., yellow) onto the location of the clod within the soil clod map 278 and/or display as such within any other graphic presented on the user interface 130. If a detected soil clod does exceed the first threshold and the second threshold based on a predefined characteristic (e.g., a predefined size, shape, etc.), the user interface 130 may overlay a third pattern/color (e.g., red) onto the location of the clod within the soil clod map 278 and/or display as such within any other graphic presented on the user interface 130.

Additionally, as indicated above, the computing system 102 (or a separate computing system) may be configured to control the operation of an associated agricultural machine based on the detection of a soil clod meeting a predefined characteristic (e.g., a predefined size, shape, etc.) and/or a change in the number of soil clods meeting various characteristics. For instance, when the field sensor(s) 44 are installed on an agricultural machine, the present subject matter may allow for real-time detection of soil clods within a field as the machine traverses the field during the performance of an agricultural operation. In such an embodiment, adjustments of the operation of the agricultural machine may be made in real-time or on the fly in response to the detection of the soil clod meeting a predefined characteristic (e.g., a predefined size, shape, etc.) and/or a change in the number of soil clods meeting various characteristics. For example, when the agricultural machine includes a tillage implement configured to perform tillage operation within the field (e.g., the implement 14 shown in FIG. 1), real-time or on-the-fly adjustments may be made to the tillage parameters associated with the ground-engaging tools of the implement, such as by adjusting the penetration depth, down pressure/force, angle-of-attack, and/or the like of one or more of the ground-engaging tools.

Moreover, in embodiments in which the disclosed system is configured to capture both pre-tilled and post-tilled images of the field, the computing system 102 may be configured to compare and contrast the pre-tilled and post-tilled images to assess the effectiveness of a tillage implement in breaking-up or dispersing the soil clods. For instance, when a soil clod meeting a predefined characteristic (e.g., a predefined size, shape, etc.) and/or a change in the number of soil clods meeting various characteristics is detected in a pre-tilled image of a given region of the field, a corresponding post-tilled image of such region of the field may also be captured to determine whether the soil clod meeting a predefined characteristic (e.g., a predefined size, shape, etc.) and/or a change in the number of soil clods meeting various characteristics still exist within the field. To the extent the soil clod meeting a predefined characteristic (e.g., a predefined size, shape, etc.) and/or a change in the number of soil clods meeting various characteristics is still present, the post-tilled soil clod meeting a predefined characteristic (e.g., a predefined size, shape, etc.) and/or a change in the number of soil clods meeting various characteristics can be compared to the pre-tilled soil clod meeting a predefined characteristic (e.g., a predefined size, shape, etc.) and/or a change in the number of soil clods meeting various characteristics to determine if the soil clod meeting a predefined characteristic (e.g., a predefined size, shape, etc.) and/or a change in the number of soil clods meeting various characteristics was reduced and, if so, to what extent.

Figure 12:
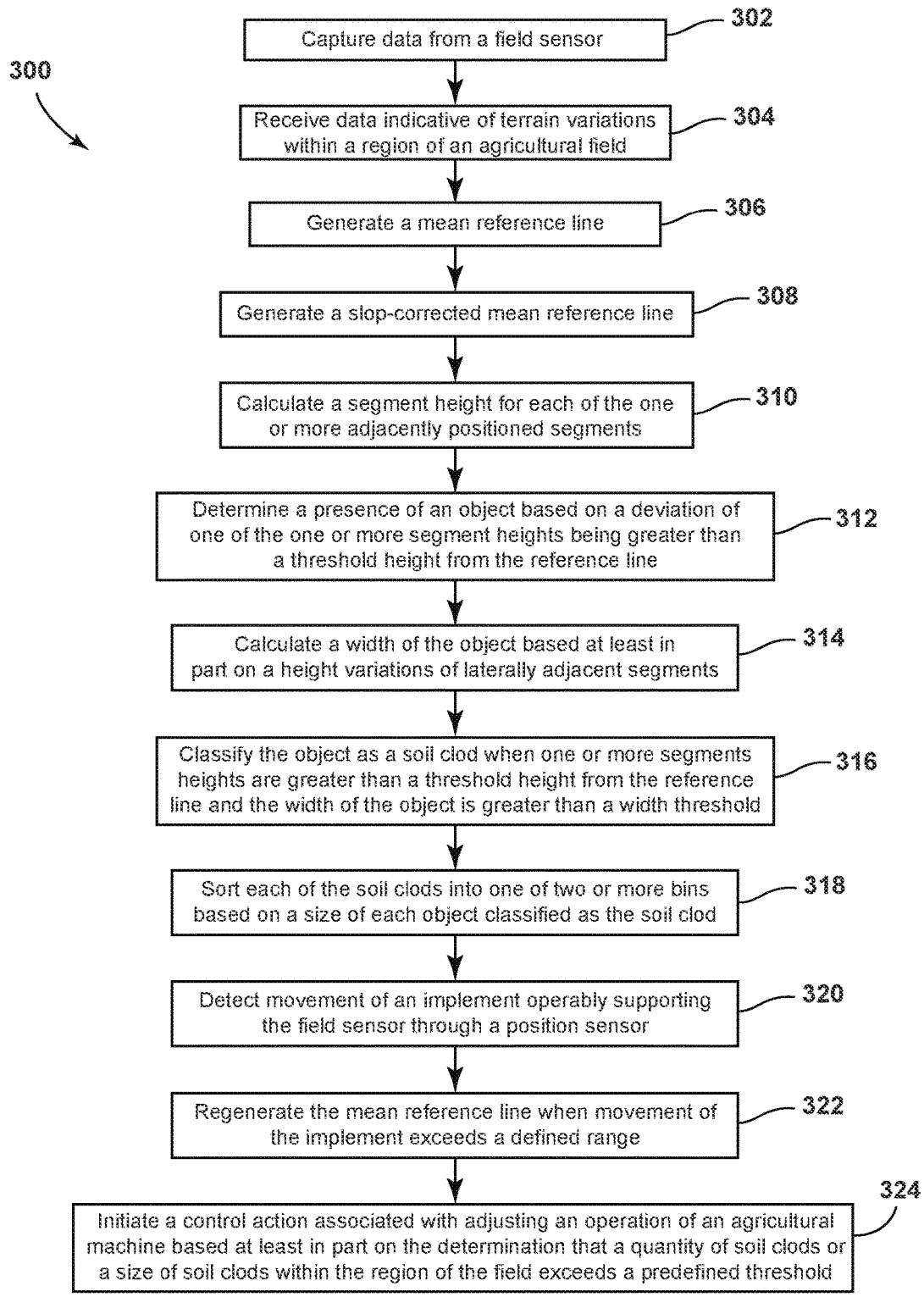
FIG. 12 illustrates a flow diagram of a method for detecting soil clods within a field in accordance with aspects of the present subject matter.

Referring now to FIG. 12, a flow diagram of a method 400 for detecting soil clods within a field is illustrated in accordance with aspects of the present subject matter. In general, the method 300 will be described herein with reference to the agricultural machine 10 shown in FIG. 1-3 and the various system components shown in FIG. 4. However, it will be appreciated that the disclosed method 300 may be implemented with agricultural machines having any other suitable machine configurations and/or within systems having any other suitable system configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As illustrated, at (302), the method 300 can include capturing data from a field sensor. For example, in some examples, capturing data may include emitting a pulse of radiation from a housing and receiving a portion of the pulse of radiation within a photodetector from the region of the field. Since the pulse of radiation travels at the speed of light, a distance between the field sensor(s) and the region of the field (and/or objects within the region of the field) may be determined based on the determined time of flight.

At (304), the method 300 can include receiving data indicative of terrain variations within a region of an agricultural field with a computing system. As provided herein, the region of the field may be comprised of one or more adjacently positioned segments. In use, the field sensor(s) may be configured to detect a feature, such as a height relative to a reference point, within each segment.

At (306), the method 300 can include generating a mean reference line with the computing system. The mean reference line can extend through a mean height of the region. In such instances, the height of each segment may be summed and divided by the number of segments.

In some examples, at (308), the method 300 can include generating a slope-corrected mean reference line in which the mean reference line is corrected based on an estimated slope of the region of the field.

At (310), the method 300 can include calculating a segment height for each of the one or more adjacently positioned segments with the computing system. With reference to segment heights, the reference line may be a height origin. As such, any height above the reference line may be considered a positive height while any height below the reference line may be considered a negative height.

At (312), the method 300 can include determining a presence of an object based on a deviation of one of the one or more segment heights being greater than a threshold height from the reference line. At (314), the method 300 can include calculating a width of the object based at least in part on a height variation of laterally adjacent segments with the computing system.

At (316), the method 300 can include classifying the object as a soil clod when one or more segment heights are greater than a threshold height from the reference line and the width of the object is greater than a width threshold. In addition, at (318), the method 300 can include sorting, with the computing system, each of the soil clods into one of two or more bins based on a size of each object classified as the soil clod.

At (320), the method 300 can include detecting movement of an implement operably supporting the field sensor(s) through a position sensor, which may include Wherein movement of an implement includes changing a tilling depth of the implement and/or movement of the implement as the machine traverses the field. As provided herein, the position sensor may be configured as an inertial measurement unit (IMU) that measures a specific force, angular rate, and/or an orientation of the implement using a combination of accelerometers, gyroscopes, magnetometers, and/or any other practicable device. At (322), the method 300 can include regenerating the mean reference line when movement of the implement exceeds a defined range.

At (324), the method 300 can include initiating a control action associated with adjusting an operation of an agricultural machine based at least in part on the determination that a quantity of soil clods or a size of soil clods within the region of the field exceeds a predefined threshold.

In various examples, the method 300 may implement machine learning methods and algorithms that utilize one or several machine learning techniques including, for example, decision tree learning, including, for example, random forest or conditional inference trees methods, neural networks, support vector vehicles, clustering, and Bayesian networks. These algorithms can include computer-executable code that can be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for determining soil clods within a field, the method comprising:
   receiving, with a computing system, data indicative of terrain variations within a region of an agricultural field, the region of the field being comprised of one or more adjacently positioned segments;
   generating, with the computing system, a mean reference line, the mean reference line extending through a mean height of the region;
   calculating, with the computing system, one or more segment heights for each of the one or more adjacently positioned segments;
   determining, with the computing system, a presence of an object based on a deviation of one of the one or more segment heights being greater than a threshold height from the mean reference line; and
   initiating, with the computing system, a control action associated with adjusting an operation of an agricultural machine based on the presence of the object, the control action configured to adjust one or more operating parameters associated with one or more ground-engaging tools.

2. The method of claim 1, further comprising:
   calculating, with the computing system, a width of the object based at least in part on a height variation of laterally adjacent segments.

3. The method of claim 2, further comprising:
   classifying, with the computing system, the object as a soil clod when one or more segment heights are greater than the threshold height from the mean reference line and the width of the object is greater than a width threshold.

4. The method of claim 3, further comprising:
   sorting, with the computing system, each of the soil clods into one of two or more bins based on a size of each object classified as the soil clod.

5. The method of claim 1, further comprising:
   generating, with the computing system, a slope-corrected mean reference line in which the mean reference line is corrected based on an estimated slope of the region of the field.

6. The method of claim 1, wherein the control action is based at least in part on the determination that a quantity of soil clods or a size of soil clods within the region of the field exceeds a predefined threshold.

7. The method of claim 1, wherein the data indicative of terrain variations comprises receiving the data from a lidar system supported relative to the agricultural machine, the data being captured by the lidar system as the agricultural machine travels across the field.

8. The method of claim 7, further comprising:
   detecting, with a position sensor, movement of an implement operably supporting a field sensor; and
   regenerating, with the computing system, the mean reference line when movement of the implement exceeds a defined range.

9. The method of claim 8, wherein movement of an implement includes changing a tilling depth of the implement.

10. The method of claim 1, further comprising:
    emitting a pulse of radiation from a housing of a field sensor; and
    receiving a portion of the pulse of radiation within a photodetector from the region of the field.

11. A system for determining one or more soil clods within a field, the system comprising:
    a field sensor configured to capture data of the field; and
    a computing system communicatively coupled to the field sensor, the computing system including a processor and associated memory, the memory storing instructions that, when implemented by the processor, configure the computing system to:
        receive the captured data from the field sensor of a first region of the field, the first region of the field including one or more first segments;
        determine a height between the field sensor and the field for each of the one or more first segments within the first region of the field;
        generate a first terrain plot indicative of a distance between the field sensor and each of the one or more first segments within the first region of the field;
        generate a first reference line based on the first terrain plot, wherein a first segment has a negative height relative to the reference line and a second segment has a positive height relative to the reference line;
        identify an object within the one or more first segments of the first terrain plot as a soil clod based on the second height exceeding a defined threshold; and
        control a user interface operably coupled with the computing system based on the identifying of the object.

12. The system of claim 11, wherein the first reference line is a mean line of the first terrain plot.

13. The system of claim 11, wherein the computing system is further configured to determine vertical movement of the field sensor.

14. The system of claim 13, further comprising:
    a position sensor operably coupled with an implement, the position sensor configured to capture data indicative of movement of the implement, wherein the field sensor is operably coupled with the implement.

15. The system of claim 13, wherein the computing system is further configured to:
    receive the captured data from the field sensor of a second region of the field, the second region of the field including one or more second segments;
    determine a height between the field sensor and the field for each of the one or more second segments within the second region of the field;
    generate a second terrain plot indicative of a distance between the field sensor and each of the one or more second segments within a second region of the field; and
    generate a second reference line based on the terrain plot, wherein a second segment has a negative height relative to the reference line and a second segment has a positive height relative to the reference line,
    wherein the vertical movement is a difference between the first reference line and the second reference line.

16. A system for an agricultural machine, the system comprising:
    a field sensor configured to capture data of a region of a field; and
    a computing system communicatively coupled to the field sensor, the computing system including a processor and associated memory, the memory storing instructions that, when implemented by the processor, configure the computing system to:
        receive the captured data from the field sensor of the region of the field, the region of the field including one or more segments;

generate a reference line, wherein a first segment has a negative height relative to the reference line and a second segment has a positive height relative to the reference line;

identify the one or more segments of the region as an object based on the second height exceeding a defined threshold from the reference line; and alter an operation of the agricultural machine based on the identification of the object.

17. The system of claim 16, wherein the field sensor is a lidar system including one or more radiation sources operative to emit a pulse of radiation and a photodetector configured to receive a portion of the pulse of radiation.

18. The system of claim 16, wherein the region may generally extend a latitudinal width that is equal to a working width of an implement.

19. The system of claim 16, wherein the region defines a longitudinal centerline, the longitudinal centerline being perpendicular to a direction of forward movement of the agricultural machine.

20. The system of claim 16, further comprising:

a location device configured to store location data in association with the captured data from the field sensor.

* * * * *